Patented Nov. 1, 1938

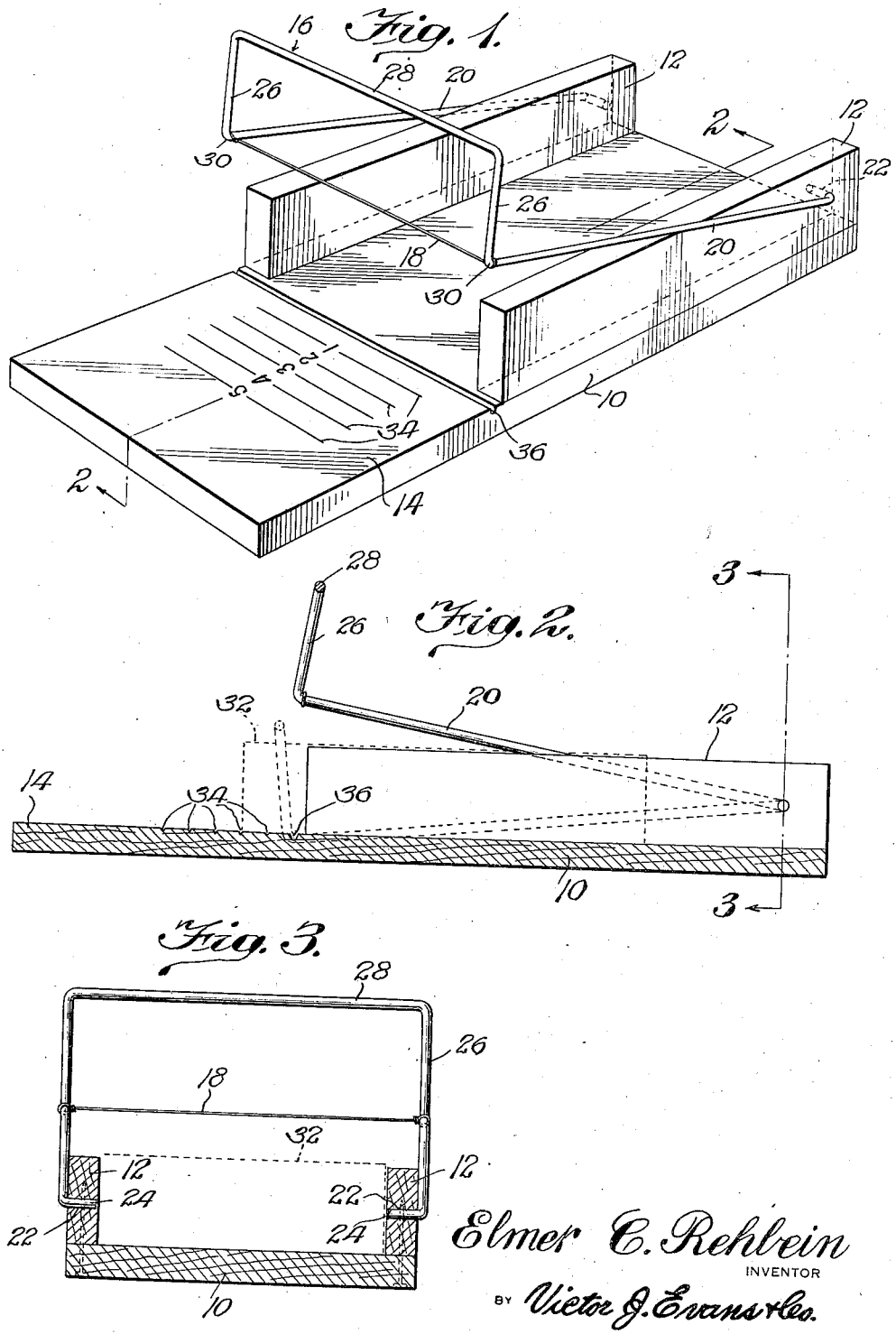

2,135,113

UNITED STATES PATENT OFFICE 2,135,113

MEASURING AND SEVERING DEVICE

Elmer C. Rehbein, Appleton, Wis.

Application July 6, 1937, Serial No. 152,281

1 Claim. (Cl. 107—20)

My invention relates to the division of bulk products of a plastic nature, such as yeast and the like, into smaller portions of predetermined volume for retail purposes and includes among its objects and advantages the provision of an improved gauge and severing device.

In the accompanying drawing:

Fig. 1 is a perspective view of the invention;

Fig. 2 is a sectional view along the line 2—2 of Fig. 1; and

Fig. 3 is a sectional view along the line 3—3 of Fig. 2.

In the embodiment selected to illustrate my invention I make use of a base 10 including upstanding flanges 12 terminating short of one end of the base to provide a gauge extension 14. While the device is primarily designed for cutting yeast into retail units from the original bulk, the invention works equally well in connection with other semi-solid products.

A wire frame 16 is movably related to the flanges 12 and includes a cutting wire 18. Wire frame 16 comprises a single piece bent to provide two parallel reaches 20 shaped to have pivots 22 rotatably mounted in openings 24 in the flanges 12. Reaches 20 terminate in upstanding reaches 26 which are interconnected by a horizontal reach 28. Wire 18 has its ends looped about the frame 16 at the bends 30 and may be fixedly connected by soldering and the like. Originally, the wire frame 16 is so shaped that the reaches 20 have pressure relation with the outer faces of the flanges 12, which pressure relation is such as to support the frame in the position of Fig. 1, at which time the material to be cut may be pushed underneath the wire. In Fig. 2, I illustrate the cake of yeast at 32, which cake rests upon the base 10 and is guided by the flanges 12, as illustrated in Fig. 3.

On the upper face of the gauge extension 14 I provide division lines 34. In operation, the cake 32 is advanced to bring the end to be severed into registration with the selected division line 34 depending upon the amount to be cut off. The division lines may be graduated in such a manner as to accurately determine the size of cut in relation to the price of the retail unit. With the cake 32 properly positioned, the wire 18 is pushed through the cake by applying pressure on the horizontal reach 28. The wire cuts easily through the cake and complete severance is attained because of the groove 36 in the gauge extension 14. My invention enables the user to easily and quickly cut the yeast into units of predetermined size. While I have disclosed the base and flanges as being constructed of wood, the device may be formed of sheet metal. In the event that the bulk material being cut is narrower than the spacing between the flanges 12, the material may be guided along one of the flanges. Wire 18 is arranged at right angles to the flanges so that an accurate cut will be made whether the bulk material fits snugly between the flanges or is guided by one only.

Without further elaboration, the foregoing will so fully explain my invention that others may, by applying current knowledge, readily adapt the same for use under various conditions of service.

I claim:

A severing device of the type described comprising a base, guide flanges carried by the base, said base being provided with an extension having gauge means for locating the material to be severed, a U-shaped frame having the ends of its legs pivotally connected with said flanges, a severing wire carried by said legs, the bight of said U-shaped frame together with a portion of its legs being bent out of the plane of the remaining portion of the legs, to constitute a grip.

ELMER C. REHBEIN.